United States Patent Office 2,713,049
Patented July 12, 1955

2,713,049

PYRIDINECARBOXYLIC ACID-1-OXIDE DERIVATIVES

Jack Bernstein and Kathryn Alice Losee, New Brunswick, N. J., assignors to Olin Mathieson Chemical Corporation, New York, N. Y., a corporation of Virginia No Drawing. Application April 27, 1953, Serial No. 351,516

7 Claims. (Cl. 260—294.8)

This invention relates to pyridinecarboxylic acid-1-oxide derivatives containing a thiol or guanylmercapto group α to the N-oxide group, and methods for the preparation thereof.

More particularly, the invention includes pyridinecarboxylic acid-1-oxide derivatives containing a thiol or guanylmercapto group α to N-oxide group of the general formula

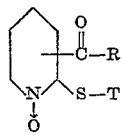

wherein R is —OH, —NHOH, —NH$_2$, —NHNH$_2$, —O-alkyl, —O-alkenyl or —O-aralkyl; and T is hydrogen, or guanyl in acid-addition salt form; and salts of those compounds wherein T is hydrogen.

In R groups which are O-alkyl, O-alkenyl or O-aralkyl, the alkyl group may be methyl, ethyl, propyl, isopropyl, butyl, sec. butyl, hexyl, amyl, dodecyl, stearyl, etc.; the alkenyl group may be propenyl, a butenyl, a pentenyl, an undecylenyl, etc.; and the aralkyl group may be benzyl, phenethyl, etc. Preferred are the compounds wherein R is O-alkyl, especially those compounds in which the alkyl group is lower alkyl.

The N-oxides wherein T is hydrogen may be in tautomeric equilibrium with the corresponding N-hydroxide, e. g.

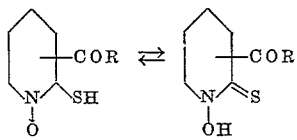

R being as defined hereinbefore. This tautomerism will not be alluded to hereinafter, it being understood that both forms are included when a particular compound is referred to, either by name or formula.

The compounds of this invention are valuable intermediates and medicinals, those in which R is —O-alkyl, —O-alkenyl or —O-aralkyl being particularly useful as antifungal agents, thus utilizable in the treatment of dermatophytosis pedis and in the control of other superficial fungus infections of the skin and accessible mucous membranes.

Following, in outline form, is an illustration of methods for preparing compounds of this invention wherein a

group is in the 4-position:

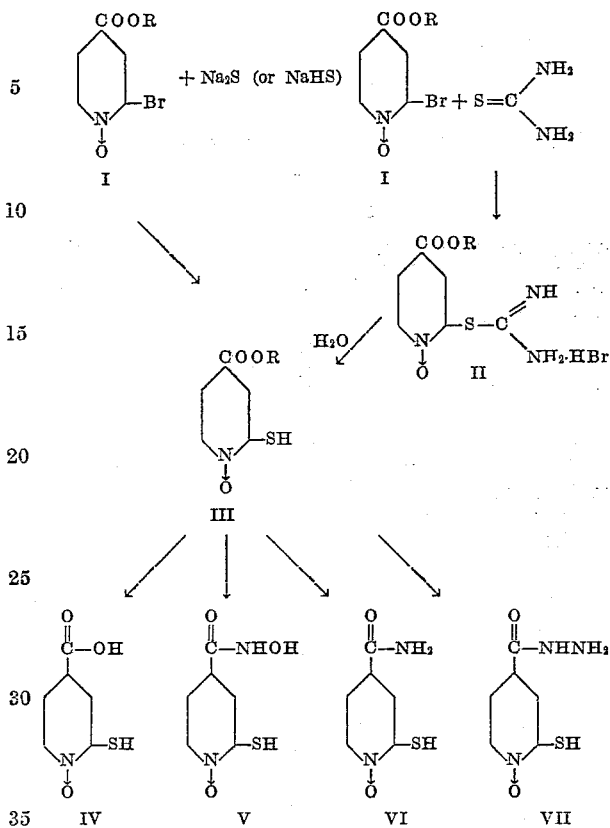

The terms alkyl, alkenyl and aralkyl, as used herein, include branched as well as straight chain alkyl or alkenyl groups.

The α-mercaptopyridinecarboxylate-1-oxides of this invention may be obtained by converting a compound of the general formula

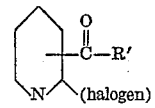

(wherein R' is a member of the group consisting of O-alkyl, O-alkenyl and O-aralkyl) to its N-oxide by reaction with an organic per-acid, such as peracetic or perbenzoic acid, and reacting the N-oxide formed with a member of the group consisting of alkali-metal sulfides, alkali-metal hydrosulfides and thiourea, then neutralizing the reaction mixture to obtain a α-mercaptopyridinecarboxylate-1-oxide. The intermediate guanylmercapto compound formed when thiourea is used may be isolated in the form of a hydrohalide acid-addition salt.

The α-mercaptopyridinecarboxylate-1-oxides of this invention may be hydrolized to form the free carboxylic acid, and the latter reacted with hydroxylamine to form a hydroxamic acid, with alcoholic ammonia to form the carboxamide, or with hydrazine to form the hydrazide.

The α-mercaptopyridinecarboxylate-1-oxides may also be prepared from the free carboxylic acids, their acid halides or anhydrides by reactions with the desired alcohol.

Salts of those compounds of this invention which contain an acidic radical (i. e. —COOH or —SH) may be prepared by reaction with an appropriate basic material, such as an alkali or alkaline earth group hydroxide, a heavy metal hydroxide or salt or an amine. Thus, for example, treatment with sodium, potassium, barium, calcium, strontium or magnesium hydroxide will yield the corresponding salt by reaction with either the carboxyl or mercapto group. Similarly, heavy metal salts may be formed by treatment with reactants such as copper sulfate, zinc hydroxide, etc. The amine salts are prepared by reaction of the acid with the desired amino compound (e. g. methylamine, ethylamine, diethylaminoethylamine, procaine, benzylamine, cetylamine, cetyldimethylamine, undecylenamine), usually in an organic solvent.

With those compounds which contain the basic

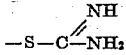

group, one may form hydrohalic acid-addition salts, such as the hydrochloric, hydrobromic, or hydriodic acid salts. Other acid-addition salts, such as the sulfuric, phosphoric, vanillic, citric, lactic, tartaric or fatty acid (e. g. acetic, propionic, caproic, caprylic, undecylenic and palmitic) salts may be prepared from the hydrohalides by double decomposition with the silver salt of the desired acid.

Illustrating utilization of the compounds of this invention as chemotherapeutic agents, methyl 2-mercaptoisonicotinate-1-oxide for example (designated as "agent" in the formulations below) may be formulated and used as follows:

A. Chemotherapeutic nasal decongestant solution containing per ml. water [to be administered intranasally by drops, nebulizer or gauze pack for symptomatic relief of acute rhinitis, vasomotor rhinitis and nasopharingitis]:
    Agent _____gamma__ 50–100
    Phenylephrine hydrochloride _____ mg.___ 2.5
    Phosphate buffer (to about pH 7)
B. Lubricating jelly:
    Carboxymethycellulose _____gm__ 20
    Agent _____mg__ 55
    Water, q. s. _____gm__ 1000
C. Eardrops:
    Agent _____mg__ 5.0
    Urea _____gm__ 10
    Intracaine hydrochloride (β-diethylaminoethyl p-ethoxybenzoate hydrochloride) _____gm__ 0.5
    Polyethyleneglycol q. s. _____ml__ 100
D. Foot powder:
    Agent _____gamma__ 50
    Starch (with 5% talc) q. s. _____gm____ 1
E. Troches: Per cent
    Saccharin _____ 0.2
    Benzocaine _____ 1.0
    Karaya gum _____ 0.8
    Acacia powder _____ 10.0
    Magnesium stearate _____ 10.0
    Lactose _____ 28.0
    Powdered sugar _____ 50.0
    Agent—may be from about 0.25 mg. to 1 gram per troche, with the lower limits (e. g. 0.25–0.50 mg.) applicable for use with antibiotics.
    Flavor—as desired.

Following are specific working examples which are illustrative but by no means limitative of the invention:

EXAMPLE 1

*Methyl 2-guanylmercaptoisonicotinate-1-oxide*

(a) *Methyl 2-bromoisonicotinate - 1 - oxide.* — 48 g. methyl 2-bromoisonicotinate is added to a solution of 38 g. perbenzoic acid in 600 ml. chloroform and the solution is allowed to remain at room temperature for 4 days. The reaction mixture is then extracted three times with 150 ml. portions of 20% hydrochloric acid and the combined acid extract is evaporated to dryness in vacuo. The residue is recrystallized from ethanol-ethyl ether to yield the purified methyl 2-bromoisonicotinate-1-oxide as the hydrochloride.

(b) *Methyl 2-guanylmercaptoisonicotinate-1-oxide.*— To a solution of 11.6 g. methyl 2-bromoisonicotinate-1-oxide hydrochloride in 100 ml. methanol is added a solution of 3.8 g. thiourea in 100 ml. methanol. The mixture is refluxed for ½ hour. The methanol is then removed under reduced pressure to yield about 12 g. crystalline methyl 2-guanylmercaptoisonicotinate-1-oxide hydrochloride, M. P. 145–146° C. (dec.).

EXAMPLE 2

*Methyl 2-mercaptoisonicotinate-1-oxide*

A solution of 35 g. methyl 2-guanylmercaptoisonicotinate-1-oxide hydrochloride and 20 g. sodium carbonate in 500 ml. water is allowed to remain at room temperature for 15 minutes. The solution is then filtered after adding a filter-aid (e. g. Hy-Flo) and the filtrate is neutralized with 20% HCl, using Congo red as an indicator. The crystalline precipitate which forms is separated by filtration to yield about 12 g. methyl 2-mercaptoisonicotinate-1-oxide, M. P. 94–95° C. [Treatment of the free base in ethyl ether with hydrogen chloride yields the hydrochloric salt.]

EXAMPLE 3

*Isopropyl 2-guanylmercaptoisonicotinate-1-oxide*

(a) *Isopropyl 2-chloroisonicotinate.*—A mixture of 50 g. α-chlorisonicotinic acid and 400 ml. thionyl chloride is refluxed for 3 hours. The unreacted thionyl chloride is then distilled from the reaction mixture under reduced pressure. To the residue is added 300 ml. hexane and the mixture is heated under reduced pressure to remove the hexane and residual thionyl chloride, which separates in mixture with the hexane. This separation is repeated twice in order to remove the last traces of thionyl chloride. To the residue is added 500 ml. isopropanol and the resulting solution is refluxed for 1 and ½ hours. The isopropanol is separated by distillation and 500 ml. water is added to the residue. The oil, which separates, is extracted twice with 300 ml. portions of ethyl ether. The ether extracts are combined, washed twice with 250 ml. portions of 5% aqueous sodium carbonate solution, then with 300 ml. water and finally dried over magnesium sulfate. The ether is then separated by distillation and the residue is fractionated to yield about 27 g. isopropyl 2-chloroisonicotinate, B. P. 89° C. at 0.7 mm. pressure.

(b) *Isopropyl 2-chlorisonicotinate-1-oxide hydrochloride.*—A solution of 27 g. isopropyl 2-chloroisonicotinate and 25 g. 40% peracetic acid in 200 ml. acetic acid is heated on a steam bath for 4 hours. The solvent is removed by heating under reduced pressure and the residue is poured onto cracked ice, then made alkaline by the addition of 40% potassium hydroxide. The resulting solution is extracted twice with 300 ml. portions of chloroform and the combined chloroform extracts are dried over magnesium sulfate. The dried chloroform solution is saturated with hydrogen chloride at 0–10° C. and, on evaporation of the chloroform, the solid isopropyl 2-chloroisonicotinate-1-oxide hydrochloride is obtained.

(c) *Isopropyl 2-guanylmercaptoisonicotinate-1-oxide.*— A solution of 25.2 g. isopropyl 2-chloroisonicotinate-1-oxide hydrochloride and 7.6 g. thiourea in 500 ml. absolute isopropanol is refluxed for ½ hour, then concentrated to dryness under reduced pressure. The crystalline solid is suspended in anhydrous ethyl ether, filtered, then washed with anhydrous ethyl ether to obtain the purified isopropyl 2-guanylmercaptoisonicotinate-1-oxide hydrochloride.

EXAMPLE 4

*Isopropyl 2-mercaptoisonicotinate-1-oxide*

A solution of 29.2 g. isopropyl 2-guanylmercaptoisonicotinate-1-oxide hydrochloride and 30 g. sodium carbonate in a liter of water is allowed to remain at room temperature for ½ hour. The solution is filtered, then neutralized with 10% hydrochloric acid using Congo red as an indicator. The crystalline precipitate which forms is separated by filtration then dried in a desiccator protected from light to yield isopropyl 2-mercaptoisonicotinate-1-oxide. [Treatment of the free base in ethyl ether with hydrogen bromide yields the hydrobromide salt.]

EXAMPLE 5

*Benzyl 2-guanylmercaptoisonicotinate-1-oxide*

(a) *Benzyl 2-chlorisonicotinate.*—A mixture of 50 g. 2-chloroisonictinic acid and 400 ml. thioanyl chloride is refluxed for 3 hours. The unreacted thionyl chloride is then distilled from the reaction mixture under reduced pressure. To the residue is added 300 ml. hexane and the mixture is heated under reduced pressure to remove the hexane and thionyl chloride. This separation is repeated in order to remove the last traces of thionyl chloride. To the residue is carefully added 200 ml. dry benzyl alcohol. After the addition is completed, the solution is heated on a steam bath for one hour. After cooling, the reaction mixture is poured into a liter of ice water, then neutralized by adding sodium carbonate. The resulting neutral solution is extracted twice with 300 ml. portions of ethyl ether. The combined ether extracts are washed with about 250 ml. water, then dried over magnesium sulfate. The ether and unreacted benzyl alcohol are then removed by distillation under reduced pressure to yield benzyl 2-chloroisonicotinate.

(b) *Benzyl 2-chloroisonicotinate-1-oxide.*—A solution of 24.8 g. benzyl 2-chloroisonicotinate and 25 g. 40% peracetic acid in 250 ml. acetic acid is heated on a steam bath for 4 hours. The solvent is removed by heating under reduced pressure and the residue is triturated with about 50 ml. absolute ethanol and 100 ml. ethyl ether. The resulting benzyl 2-chloroisonicotinate-1-oxide is separated by filtration. [Treatment of the free base in chloroform with hydrogen chloride yields the hydrochloride salt.]

(c) *Benzyl 2-guanylmercaptoisonicotinate - 1 - oxide.*—A solution of 26.4 g. benzyl 2-chloroisonicotinate-1-oxide and 7.6 g. thiourea in 500 ml. absolute ethanol is refluxed for ½ hour. The solvent is removed by heating under reduced pressure and the crystalline residue which remains is washed with 200 ml. anhydrous ethyl ether and dried over magnesium sulfate to yield benzyl 2-guanylmercaptoisonicotinate-1-oxide hydrochloride.

EXAMPLE 6

*Benzyl 2-mercaptoisonicotinate-1-oxide*

A solution of 34 g. benzyl 2-guanylmercaptoisonicotinate hydrochloride and 30 g. sodium carbonate in 500 ml. water is allowed to remain at room temperature for ½ hour and then filtered. The filtrate is neutralized with 10% hydrochloric acid, using Congo red as an indicator. The solid which separates is isolated by filtration and dried to yield benzyl 2-mercaptoisonicotinate-1-oxide.

EXAMPLE 7

*Methyl 6-guanylmercaptonicotinate-1-oxide*

(a) *Methyl 6-chloronicotinate-1-oxide.*—To a solution of 40 g. perbenzoic acid in 600 ml. chloroform is added 40 g. methyl 6-chloronicotinate. The solution is allowed to remain at room temperature in the absence of light for 4 days. The reaction mixture is then washed twice with 200 ml. portions of 1% sodium carbonate, once with 200 ml. water, then dried over magnesium sulfate. The chloroform is allowed to evaporate under reduced pressure to yield methyl 6-chloronicotinate-1-oxide. [Treatment of the free base in chloroform with hydrogen chloride at 0–10° C. yields the hydrochloride salt.]

(b) *Methyl 6 - guanylmercaptonicotinate-1-oxide.*—A solution of 18.8 g. methyl 6-chloronicotinate-1-oxide and 7.6 g. thiourea in 500 ml. absolute ethanol is refluxed for ½ hour. The ethanol is removed by distillation and the residue is washed with ether, then dried in a desiccator to yield methyl 6-guanylmercaptonicotinate-1-oxide hydrochloride.

EXAMPLE 8

*Methyl 6-mercaptonicotinate-1-oxide*

A solution of 26.4 g. methyl 6-guanylmercaptonicotinate-1-oxide and 30 g. sodium carbonate in a liter of water is allowed to remain at room temperature for 1 hour, then filtered. The filtrate is neutralized with 10% hydrochloric acid, using Congo red as an indicator. The precipitate which forms is separated by filtration, then dried to yield methyl 6-mercaptonicotinate-1-oxide.

EXAMPLE 9

*Methyl 2-guanylmercaptonicotinate-1-oxide*

(a) *Methyl 2-chloronicotinate.*—An intimate mixture of 75 g. 2-hydroxynicotinic acid and 220 g. phosphorous pentachloride is stirred until liquefaction occurs. The solution is then heated on a steam bath for two hours. The $POCl_3$ which forms is then separated by distillation under reduced pressure. To the residue is added 300 ml. hexane, and the hexane is then separated by distillation at reduced pressure to yield about 60 g. 2-chloronicotinoyl chloride, M. P. 55–58° C. This product is dissolved in 350 ml. anhydrous benzene to which 750 ml. anhydrous methanol is carefully added. The resulting solution is then allowed to reflux for an hour, after which the solvent is separated by distillation at reduced pressure. The residue is poured into 500 ml. water, neutralized with sodium carbonate, then extracted twice with 500 ml. portions of ethyl ether. The combined ether extracts are washed, first with 300 ml. 5% sodium carbonate, then with 300 ml. water, then dried over magnesium sulfate. The ether is then removed by distillation and the residue is fractionated to yield about 38 g. methyl 2-chloronicotinate, B. P. 87–88° at 3 mm. pressure.

(b) *Methyl 2-chloronicotinate-1-oxide.*—To a solution of 30 g. perbenzoic acid in 500 ml. chloroform is added 38 g. methyl 2-chloronicotinate. The resulting solution is allowed to remain at room temperature for 4 days in the absence of light. The reaction mixture is washed twice with 200 ml. portions of 1% aqueous sodium carbonate solution, then with 200 ml. water and finally dried over magnesium sulfate. The chloroform is then allowed to evaporate under reduced pressure to yield methyl 2-chloronicotinate-1-oxide.

(c) *Methyl 2-guanylmercaptonicotinate -1- oxide.*—A solution of 18.8 g. methyl 2-chloronicotinate-1-oxide and 7.6 g. thiourea in 500 ml. absolute ethanol is allowed to reflux for ½ hour. The alcohol is then allowed to evaporate under reduced pressure to yield a solid material which is separated by filtration, washed with anhydrous ethyl ether, then dried in a desiccator to yield methyl 2-guanylmercaptonicotinate-1-oxide hydrochloride.

EXAMPLE 10

*Methyl 2-mercaptonicotinate-1-oxide*

A solution of 26.4 g. methyl 2-guanylmercaptonicotinate-1-oxide hydrochloride and 30 g. sodium carbonate in a liter of water is allowed to remain at room temperature for one hour, then filtered. The filtrate is neutralized with 10% hydrochloric acid, using Congo red as an indicator. The solid material which precipitates is collected by filtration and dried in a desiccator to yield methyl 2-mercaptonicotinate-1-oxide.

EXAMPLE 11

*2-mercaptoisonicotinic acid-1-oxide*

A solution of 2 g. methyl 2-mercaptoisonicotinate-1-oxide in 20 ml. 10% sodium hydroxide is refluxed for 1 hour, then cooled and made strongly acid with 10% hydrochloric acid. The crystalline precipitate which forms is separated by filtration, washed with water, then dried. On recrystallization from aqueous ethanol, about 1.2 g. purified 2-mercaptoisonicotinic acid-1-oxide is obtained. The acid melts at 167–168° C. with decomposition, then solidifies again and melts at 245–247° C. with decomposition.

EXAMPLE 12

*2-mercaptoisonicotinylhydroxamic acid-1-oxide*

To a solution of 5.6 g. hydroxylamine hydrochloride in 50 ml. water is added a solution of 6.4 g. sodium hydroxide in 150 ml. water. To the resulting solution is added 7.5 g. methyl 2-mercaptoisonicotinate-1-oxide and the reaction mixture is allowed to remain at room temperature for 4 hours, cooled, then strongly acidified with 20% hydrochloric acid. The crystals, which form, are separated by filtration then washed with water. On recrystallization from acetonitrile, the purified 2-mercaptoisonicotinylhydroxamic acid-1-oxide, M. P. 159–160° C. is obtained.

EXAMPLE 13

*2-mercaptoisonicotinamide-1-oxide*

A mixture of 10 g. methyl 2-mercaptoisonicotinate-1-oxide in 50 ml. 3.7 N alcoholic ammonia is heated in a bomb tube at 150° C. for 8 hours. The crystals which form are separated by filtration, dissolved in about 100 ml. water. The water solution is then acidified with 10% hydrochloric acid. The precipitate which forms is collected to yield, after recrystallization from acetonitrile, the purified 2-mercaptoisonicotinamide-1-oxide, M. P., 165–168° C. (dec.).

EXAMPLE 14

*2-mercaptoisonicotinic acid-1-oxide hydrazide, hydrazine salt*

A solution of 12 g. methyl 2-mercaptoisonicotinate-1-oxide in 240 ml. 85% hydrazine hydrate is heated for 2 hours on a steam bath. The unreacted hydrazine hydrate is separated by distillation under reduced pressure. To the reaction mixture is added 150 ml. ethanol. The crystalline material which forms is separated by filtration, then washed twice with 250 ml. portions of boiling ethanol to yield about 12 g. 2-mercaptoisonicotinic acid-1-oxide hydrazide, hydrazine salt, M. P., 184–185° C. (dec.). [Treatment with alkali yields the free base.]

EXAMPLE 15

*Methyl 2-mercaptoisonicotinate-1-oxide*

A solution of 4.3 g. methyl 2-bromoisonicotinate-1-oxide hydrochloride in 5 ml. water is heated on a steam bath while a solution of 4.1 g. sodium sulfide nonahydrate in 20 ml. water is added in 3 portions at 20 minute intervals. After heating for an additional half hour, the reaction mixture is cooled and acidified to Congo red with 20% hydrochloric acid. The precipitate which forms is separated by filtration, dissolved in 10 ml. normal sodium hydroxide solution and filtered. The filtrate is neutralized with normal hydrochloric acid (using Congo red as indicator) to yield a methyl 2-mercaptoisonicotinate-1-oxide, M. P. 94.5–95° C.

EXAMPLE 16

*Benzyl-2-mercaptoisonicotinate-1-oxide*

Following the procedure of Example 14 except that 5.4 g. benzyl 2-bromoisonicotinate-1-oxide is used in place of the ethyl ester of the reference example benzyl 2-mercaptoisonicotinate-1-oxide is obtained.

EXAMPLE 17

*Methyl 2-mercaptoisonicotinate-1-oxide*

A solution of 25 g. methyl 2-bromoisonicotinate-1-oxide hydrochloride in 150 ml. water is neutralized with 25% aqueous sodium hydroxide solution and a solution of 15 g. sodium hydrosulfide (70%) in 100 ml. water is added. The resulting solution is heated for an hour on a steam bath. The reaction mixture is then filtered and cooled and the filtrate is neutralized with 20% hydrochloric acid solution, using Congo red as an indicator. Recrystallization from aqueous ethanol yields the purified methyl 2-mercaptoisonicotinate-1-oxide, M. P., 94.5–95° C.

EXAMPLE 18

*Hydrazine salt of methyl 2-mercaptoisonicotinate-1-oxide*

To a solution of 3.3 g. methyl 2-mercaptoisonicotinate-1-oxide in 50 ml. anhydrous methanol is added to 1.1 g. 85% hydrazine hydrate. A crystalline precipitate forms immediately. The reaction mixture is refluxed for 5 minutes, cooled, then filtered. The precipitate is recrystallized from 80 ml. anhydrous methanol to yield about 3.4 g. purified hydrazine salt of methyl 2-mercaptoisonicotinate-1-oxide, M. P., 176–178° C. (dec.).

EXAMPLE 19

*Ammonium salt of methyl 2-mercaptoisonicotinate-1-oxide*

To a solution of 10 g. methyl 2-mercaptoisonicotinate-1-oxide in 100 ml. absolute ethanol is added 40 ml. 3.5N alcoholic ammonia. The resulting mixture is allowed to remain overnight at room temperature. The precipitate, which forms, is collected by filtration, then washed with absolute ethanol. The resulting product, on recrystallization from a liter of absolute ethanol, yields about 8.5 g. purified ammonium salt of methyl 2-mercaptoisonicotinate-1-oxide, M. P., 178–180° C.

EXAMPLE 20

*Sodium salt of methyl 2-mercaptoisonicotinate-1-oxide*

To a solution 5.3 g. sodium carbonate in 300 ml. water is added 18.5 g. methyl 2-mercaptoisonicotinate-1-oxide. The resulting solution is treated with activated charcoal, then filtered. The filtrate is freeze-dried, giving a substantially quantative yield of the sodium salt of methyl 2-mercaptoisonicotinate-1-oxide.

EXAMPLE 21

*Cetyldimethylamine salt of methyl 2-mercaptoisonicotinate-1-oxide*

To a solution of 1.8 g. methyl 2-mercaptoisonicotinate-1-oxide in 5 ml. absolute ethanol is added 2.8 g. cetyldimethylamine. About 25 ml. anhydrous ethyl ether is then added and crystallization is induced by cooling and scratching the reaction vessel. The precipitate is separated by fitration. Recrystallization of the precipitate from ethanol-ethyl ether yields the purified cetyldimethylamine salt of methyl 2-mercaptoisonicotinate-1-oxide.

EXAMPLE 22

*Copper salt of methyl 2-mercaptonicotinate-1-oxide*

A solution of 1.8 g. CuSO₄.5H₂O in 150 ml. water is added to a solution of 2.1 g. sodium salt of methyl 2-mercaptonicotinate-1-oxide in 50 ml. water. The precipitate which forms is separated by filtration, washed in turn with water, ethanol and ethyl ether, then dried to yield the copper salt of methyl 2-mercaptonicotinate-1-oxide.

EXAMPLE 23

*Undecylenic acid salt of methyl 2-guanylmercaptoisonicotinate-1-oxide*

To a solution of 23 g. methyl 2-guanylmercaptoisonicotinate-1-oxide hydrochloride in hot absolute ethanol is added 18 g. silver salt of undecylenic acid in hot absolute ethanol and the mixture is refluxed on a steam bath for about 1 hour. The reaction mixture is fitered while hot. On cooling the filtrate, the undecylenic acid salt of methyl 2-guanylmercaptoisonicotinate-1-oxide precipitates and is separated.

EXAMPLE 24

*Vanillic acid salt of methyl 2-guanylmercaptoisonicotinate-1-oxide*

To a solution of 23 g. methyl 2-guanylmercaptoisonicotinate-1-oxide hydrochloride in hot absolute ethanol is added 17 g. silver salt of vanillic acid in hot absolute ethanol and the mixture is refluxed on a steam bath for about 1 hour. The reaction mixture is filtered while hot. On cooling, the vanillic acid salt of methyl 2-guanylmercaptoisonicotinate-1-oxide precipitates and is then separated.

This invention may be variously otherwise embodied within the scope of the appended claims.

We claim:

1. Compounds of the class consisting of pyridine carboxylic acid ester-1-oxide derivatives of the general formula

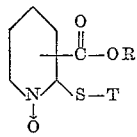

wherein R is a member of the group consisting of alkyl having 1 to 18 carbon atoms, alkenyl having 3 to 11 carbon atoms, benzyl, and phenethyl; and T is a member of the group consisting of hydrogen and guanyl in acid-addition salt form; and salts of those derivatives wherein T is hydrogen.

2. Compounds of the general formula

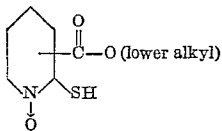

3. Salts of the compounds of claim 2.

4. Compounds of the general formula

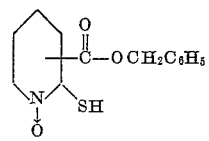

5. Salts of the compounds of claim 4.

6. The process which comprises reacting a compound of the general formula

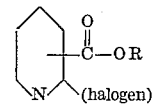

wherein R is a member of the group consisting of alkyl having 1 to 18 carbon atoms, alkenyl having 3 to 11 carbon atoms, benzyl, and phenethyl, with an organic per-acid, then reacting the N-oxide formed with a member of the group consisting of alkali metal sulfides, alkali metal hydrosulfides and thiourea, and recovering the mercapto and guanylmercapto derivatives of the pyridinecarboxylic acid-1-oxide from the mixture.

7. The process of claim 6 wherein the product of the reaction is neutralized to yield an α-mercaptopyridine-carboxylate-1-oxide.

No references cited.